Jan. 15, 1924.

R. G. KILLINGSWORTH

POISON DISTRIBUTOR

Filed Sept. 26, 1922

1,481,100

2 Sheets-Sheet 1

Inventor,
R. G. Killingsworth.

By
Attorneys

Jan. 15, 1924.
R. G. KILLINGSWORTH
POISON DISTRIBUTOR
Filed Sept. 26, 1922
1,481,100
2 Sheets-Sheet 2
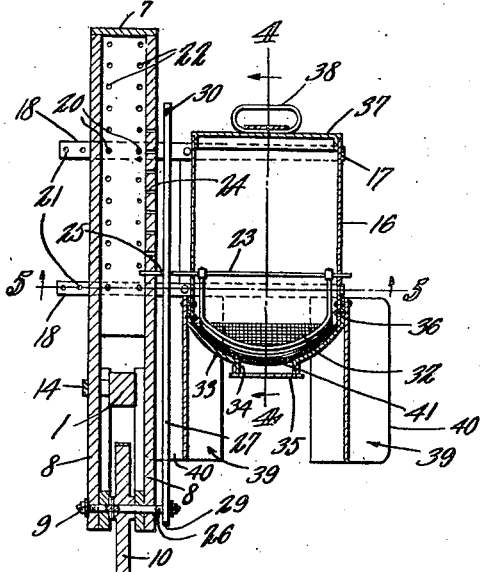
Fig. 3.
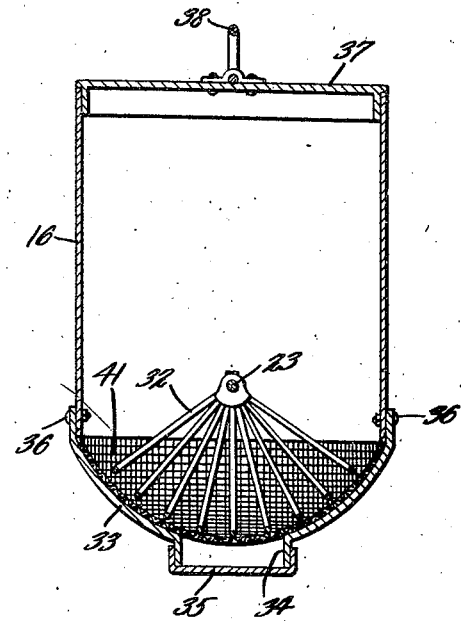
Fig. 4.
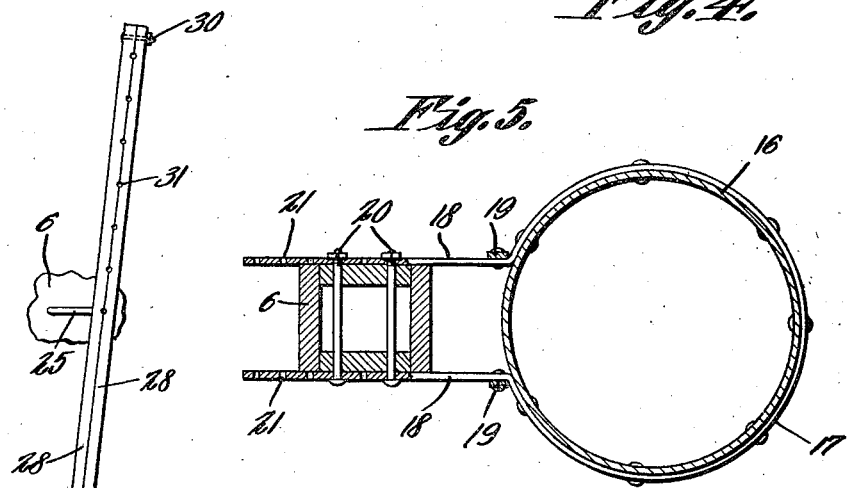
Fig. 5.
Fig. 6.
Inventor
R. G. Killingsworth.
By C. A. Snow & Co.
Attorneys Patented Jan. 15, 1924.

1,481,100

UNITED STATES PATENT OFFICE.

ROSSER GIBSON KILLINGSWORTH, OF McCORMICK, SOUTH CAROLINA.

POISON DISTRIBUTOR.

Application filed September 26, 1922. Serial No. 590,702.

*To all whom it may concern:*

Be it known that I, ROSSER G. KILLINGSWORTH, a citizen of the United States, residing at McCormick, in the county of McCormick and State of South Carolina, have invented a new and useful Poison Distributor, of which the following is a specification.

This invention aims to provide a simple means whereby a dry insecticide of any kind may be applied to cotton or tobacco plants during the cultivation thereof, or at any other time, novel means being provided for distributing the insecticide, and novel means being supplied whereby the implement may be adjusted according to the size of the standing crop.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
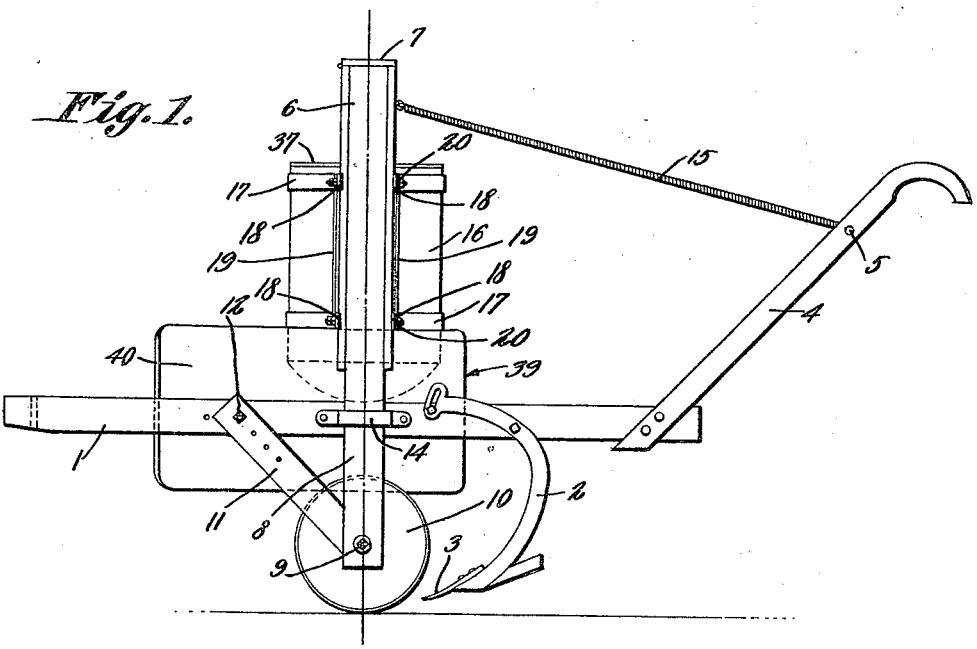
Figure 2:
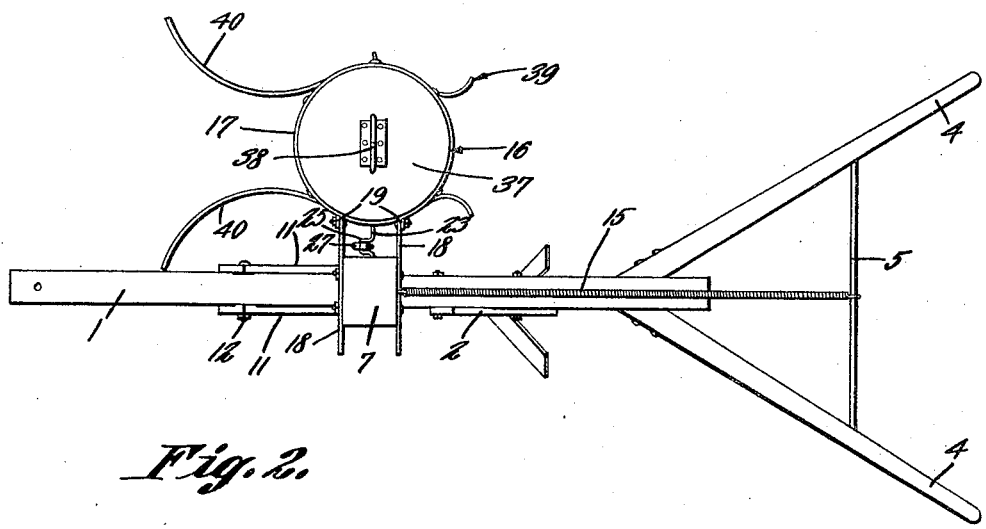

Figure 1 shows in side elevation, a device constructed in accordance with the invention; Figure 2 is a top plan; Figure 3 is a section on the line 3—3 of Figure 1; Figure 4 is a section on the line 4—4 of Figure 3; Figure 5 is a section on the line 5—5 of Figure 3; Figure 6 is an elevation illustrating the pitman.

The device forming the subject matter of this application comprises a carrying frame which may be in the form of a cultivator comprising a beam 1, a standard 2, a point 3, handles 4 and a handle brace 5, the device hereinafter described, however, being capable of being mounted upon agricultural implements of widely different sorts.

In carrying out the invention, there is provided a support or hollow post 6 supplied at its upper end with a hinged lid 7 and terminating at its lower end in spaced depending arms 8, the arms being located on opposite sides of the beam 1. An axle 9 is journaled in the lower ends of the arms 8 of the post 6. A ground wheel 10 is secured to the axle 9 and is located between the arms 8. Inclined braces 11 are provided, the forward ends of the braces being adjustably mounted, as indicated at 12, on the beam 1, the rear ends of the braces being carried by the axle 9. The arms 8 of the post 6 are loosely mounted in guides 14 on the beam 1, the construction being such that the post 6 may move upwardly and downwardly to a slight extent, as the wheel 10 traverses the ground. In view of the foregoing, the point 3 will not be lifted out of the ground when the wheel 10 encounters an obstacle. The post 6 is sustained by a retractile spring 15, the forward end of which is connected to the upper portion of the post, the rear end of which is connected to the handle brace 5.

The numeral 16 marks a receptacle located at one side of the hollow post 6. Brackets 17 are secured to the receptacle 16 and include parallel arms 18, between which the post 6 is located. The brackets 17 are spaced vertically, and the arms of the brackets are connected by vertical strips 19. Securing elements 20 unite the arms 18 of the brackets 17 with the post 6. The arms 18 of the brackets 17 have a plurality of horizontally spaced holes 21, adapted to receive the securing elements 20, and permitting the receptacle 16 to be adjusted horizontally with respect to the post 6 and the point 3, the implement thus being adapted to operate properly regardless of the space between the rows of standing plants. The post 6 is provided with vertically spaced holes 22 adapted to receive the securing elements 20, and, thus, the receptacle 16 may be raised as the standing crop increases by growth in height.

An agitator operates in the receptacle 16 and includes a horizontal shaft 23 journaled in the receptacle and in the post 6. The post 6 has vertically spaced openings 24, adapted to receive the shaft, to the end that when the receptacle 16 is adjusted vertically, as hereinbefore explained, the shaft 23 may be journaled in the post 6. The shaft 23 has a crank 25, and there is a crank 26 on the axle 9. The throw of the crank 26 on the axle 9 is less than the throw of the crank 25 on the agitator shaft 23. A pitman 27 forms an operative connection between the cranks 25 and 26. The pitman 27 may be of any desired construction, but, if preferred, it may consist of cooperating parts 28 united at their lower ends by a hinge 29, the parts 28 of the pitman 27 being connected at their upper ends by a securing element 30, such as a bolt. The parts 28 of the pitman 27 are provided on their inner edges with co-operating notches defining openings 31 which are spaced apart longitudinally of the pitman, the said openings being adapted to receive the crank 26 on the agitator shaft 23. It has been pointed out hereinbefore that the receptacle 16 may be adjusted vertically. When this vertical adjustment of the receptacle 16 takes place, there must be a vertical adjustment of the pitman 27 with respect to the crank 25 on the agitator shaft. In order to adjust the pitman 27 on the crank 25 of the agitator shaft, it is necessary merely to slack away the bolt 30, to swing the parts 28 of the pitman 27 apart on the hinge 29, the crank 25 being shifted to another of the openings 31, the parts 28 of the pitman 27 being brought together, and being held in the position shown in Figure 6, by tightening the bolt 30.

The agitator comprises a head 32 located within the receptacle 16, the head comprising any desired number of radial loop-shaped arms. The receptacle 16 includes a removable bottom 33 which may be downwardly concaved, if desired, the bottom having an opening or spout 34 covered by a removable cap 35, the bottom being so shaped that the arms of the agitator head 32 will cooperate therewith. A screen 41 is seated in the bottom 33 of the receptacle 16 and extends across the spout 34. The bottom 33 is removably connected at 36 to the receptacle 16. One bottom may be removed and another bottom be substituted therefor, the screens 41 in the bottoms being of different mesh, and the spouts 34 of the screens being of different diameters. In this way, the amount of insecticide delivered when the head 32 of the agitator is reciprocated, may be regulated. Relative to the reciprocation of the agitator head 32, it is to be observed that the throw of the crank 26 on the axle 9 is less than the throw of the crank 25 on the agitator shaft 23. Consequently, although the crank 26 may move in an orbit, an oscillatory movement will be imparted by way of the pitman 27, from the crank 26 to the crank 25 which forms part of the agitator shaft 23, the head 32 of the agitator swinging backwardly and forwardly within the receptacle 16. The receptacle 16 may be surmounted by a removable lid 37 having a handle 38. Plate-like guides 39 are secured to opposite sides of the receptacle 16 and extend approximately parallel to the line of advance of the vehicle. At their forward ends, the guides 39 are equipped with diverging wings 40 which direct the standing plants between the guides, and into the path of the spout 34, the cap 35 having been removed. The ground wheel 10 imparts rotation to the axle 9, and, through the instrumentality of the crank 36, the pitman 27 and the crank 25, rocking movement is imparted to the shaft 23 and to the agitator head 32, the head of the agitator piling up the dry insecticide within the receptacle 16, the insecticide flowing downwardly through the screen 41 and through the spout 34 upon the standing plants.

Since the post 6 is movable vertically, the post serves to transmit a jarring effect to the contents of the receptacle 16, from the wheel 10 thereby agitating the powder in the receptacle whilst the beam 1 and the handle 4 remain relatively free from vibration.

What is claimed is:—

1. In a device of the class described, a frame; a post mounted on the frame for vertical movement; a ground wheel on the lower end of the post; a receptacle located at one side of the post and carried thereby; an agitator in the receptacle; and means for connecting the agitator operatively with the ground wheel.

2. In a device of the class described, a frame; a post mounted on the frame for vertical movement; a ground wheel journaled on the lower end of the post; a receptacle located at one side of the post; means for mounting the receptacle on the post for horizontal adjustment; an agitator in the receptacle; and means for connecting the agitator operatively with the ground wheel.

3. In a device of the class described, a frame; a post mounted on the frame for vertical movement; a ground wheel journaled on the lower end of the post; a receptacle located at one side of the post; means for mounting the receptacle on the post for vertical adjustment; an agitator in the receptacle; and means for connecting the agitator with the ground wheel.

4. In a device of the class described, a frame; a post mounted on the frame for vertical movement; a ground wheel journaled on the lower end of the post; a receptacle located at one side of the post; means for mounting the receptacle on the post for horizontal adjustment and for vertical adjustment; an agitator in the receptacle; and means for connecting the agitator with the ground wheel.

5. A device of the class described comprising a frame; a post mounted on the frame for vertical movement; a receptacle located at one side of the post and mounted thereon; an agitator operating in the receptacle and including a crank; an axle journaled in the post and having a crank, the throw of the crank on the axle being less than the throw of the crank of the agitator; a pitman connecting the cranks; and a ground wheel secured to the axle.

6. In a device of the class described a frame; a post mounted on the frame for vertical movement; a ground wheel journaled on the lower end of the post; a receptacle located at one side of the post and carried thereby; an agitator in the receptacle; cranks assembled with the agitator and with the ground wheel; and a pitman engaged with one crank, the pitman being supplied with longitudinally spaced elements adapted one at a time, to receive the other crank when the receptacle is adjusted vertically with respect to the post.

In testimony that I claim the foregoing as my own, I have hereto affixed my signature in the presence of two witnesses.

ROSSER GIBSON KILLINGSWORTH.

Witnesses:
R. L. GUDY,
J. E. BRADLEY.